Jan. 16, 1962     E. D. PALMER     3,017,224
WHEEL-BALANCING ASSEMBLY FOR TRUCK WHEELS AND THE LIKE
Filed Sept. 4, 1959     2 Sheets-Sheet 1

INVENTOR.
ELMER D. PALMER
BY
ATTORNEYS

Jan. 16, 1962     E. D. PALMER     3,017,224
WHEEL-BALANCING ASSEMBLY FOR TRUCK WHEELS AND THE LIKE
Filed Sept. 4, 1959     2 Sheets-Sheet 2

INVENTOR.
ELMER D. PALMER
BY
ATTORNEYS

United States Patent Office 3,017,224
Patented Jan. 16, 1962

3,017,224
WHEEL-BALANCING ASSEMBLY FOR TRUCK
WHEELS AND THE LIKE
Elmer D. Palmer, Rancho Cordova, Calif.
Filed Sept. 4, 1959, Ser. No. 838,154
6 Claims. (Cl. 301—5)

This invention relates to wheel balancing and, more specifically, to an adapter plate and adjustable wheel weights for use thereon as a dynamic balancing assembly for truck wheels and the like.

Since the advent of relatively high-speed rubber-tired vehicles, more and more attention has been given to the maintenance of the wheels in proper alignment and balance to prevent excessive tire wear, increase driving comfort and ease of operation at highway speeds, and as a safety measure. Most of these efforts in recent years, however, have been directed to the problem of improving the dynamic balancing machines to an extent where the wheel weights could be positioned more accurately. Little attention, on the other hand, has been given to the problem of the wheel weights themselves which, in certain applications, are a very significant factor effecting overall wheel balance.

With ordinary automobile wheels, for example, the wheel weights are not especially significant as lead slugs of different sizes are merely clamped at the indicated locations on the wheel rim where they usually remain until the tires are changed or recapped. Some drivers prefer to have their wheels balanced periodically, but even then it is seldom done oftener than once a year except when a shimmy develops or uneven tire wire indicates an out-of-balance condition.

With truck wheels, on the other hand, this problem of maintaining proper balance assumes much greater importance when it is considered that many of these vehicles travel several thousand miles a week at relatively high speeds and under heavily-loaded conditions. Tire wear is apt to be excessive under these circumstances if one or more of the wheels is even a small amount out-of-balance. Also, certain other factors such as uneven brake drum wear, damaged wheel rims, etc. can cause the wheels to get out-of-balance rather quickly. The brake drums, especially, may wear down rather rapidly when traveling through mountainous country and within large urban areas where the brakes must be applied on frequent occasions.

One further factor should be mentioned briefly, namely, that of greater wheel diameter when compared with that of passenger automobiles. This, of course, has a substantial influence on the dynamic forces involved as the same eccentric mass located on the periphery of a large truck tire will produce much greater tread wear and attendant difficulties than if the same mass were found on the circumference of an ordinary automobile tire.

As a result of these several problems coupled with the high cost of replacing truck tires, many truck fleet operators have found it advisable to rebalance the wheels of each truck at relatively short intervals, sometimes as often as once a week if the vehicle has just completed a long trip. The time and expense involved in this wheel-balancing operation, however, becomes appreciable if not prohibitive when conventional passenger-automobile-type wheel weights are used. For example, if the wheel is out-of-balance, the wheel weights must be removed and replaced by other weights of a different size and at different locations. Obviously, this operation can, and usually does, involve a great deal of time plus the considerable expense of replacing the weights.

It has now been found, however, that the aforementioned difficulties can, in large measure, be eliminated through the use of the adapter plate and associated adjustable wheel weights of the present invention. The adapter plate is attached to the wheel disk by means of the wheel lugs and it is formed to provide a continuous circumferential groove located outside the ring of lugs. A pair of wheel weights are mounted within the grooves for peripheral slidable movement therein to any angular position relative to the axis of rotation that is required to place the wheel in balance. Suitable locking means are also provided for fastening the weights in adjusted position.

Thus, the wheel weights of the present invention need never be removed or replaced unless they or the adapter plate becomes damaged. Also, the placement of the weights at the proper point on the periphery of the adapter plate to compensate for an unbalanced condition in the wheel is a fast and inexpensive operation that can be performed economically at very frequent intervals with conventional dynamic wheel-balancing machines to indicate the positions of the weights. Furthermore, the speed with which this operation can be performed results in the operator's balancing the wheels more frequently which, of course, cuts down considerably on tire replacements due to uneven treadwear and the like.

It is, therefore, the principal object of the present invention to provide a novel and improved adapter plate and adjustable wheel weight assembly especially suited for use on truck wheels and the like.

A second objective is to provide a wheel-balancing assembly of the class described which requires no removal and/or replacement of the wheel weights at the time the wheels are balanced.

Another object is the provision of a truck-wheel balancing assembly in which the weights are positioned near the periphery of the wheel so that the same counterbalancing effect can be achieved with smaller weights.

Still another objective of the instant invention is to provide a wheel weight and adapter plate assembly for truck wheels that is ideally suited for use with wheel-balancing machines that balance the wheels while in place on the vehicle thus eliminating the time and expense involved in removing the wheels and also compensating for out-of-balance brake drums.

An additional object of the wheel balancing assembly of the invention claimed herein is to provide one that is much less expensive when considered over long periods of use than the conventional wheel weights for this purpose.

Additional objects are to provide wheel weights and an adapter plate for carrying same that is rugged, adaptable to many different types, styles and sizes of truck wheels, one that is versatile, and a device of the class described that does not interfere with normal operation of the vehicle including changing tires, etc.

Other objects will be in part apparent and in part pointed out specifically hereinafter in connection with the description of the drawings that follows, and in which.

Figure 1:
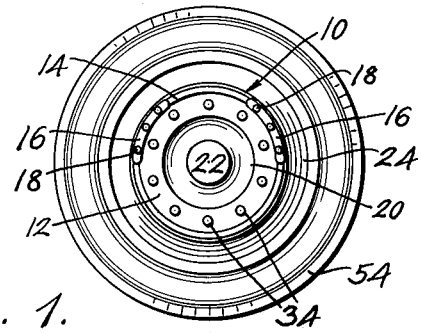
FIGURE 1 is a side elevation of a truck wheel or the like showing the adapter plate and adjustable wheel weight assembly of the present invention bolted in place upon the wheel disk.
Figure 2:
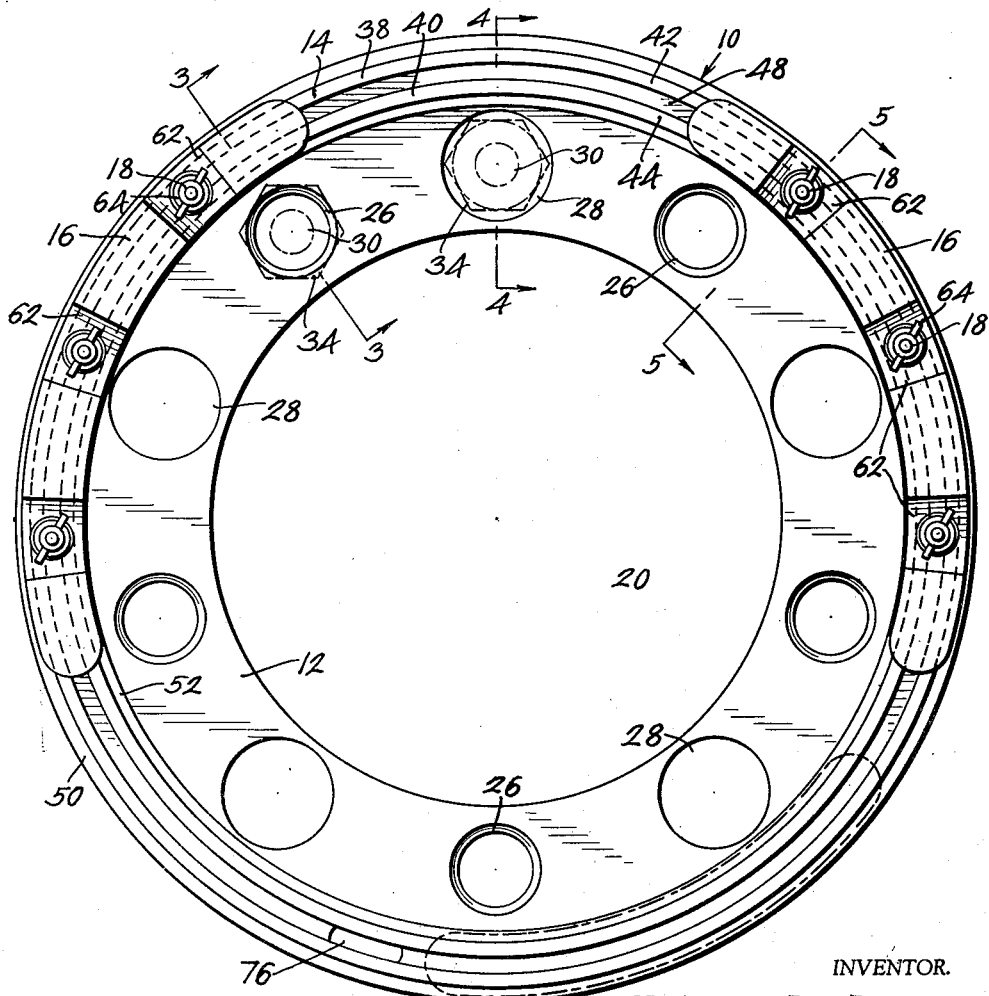
FIGURE 2 is a side elevation to a greatly enlarged scale showing the adapter plate and wheel weight assembly apart from the wheel.
Figure 3:
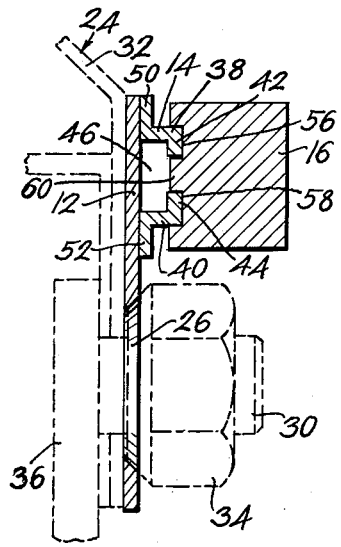
FIGURE 3 is a section to a further enlarged scale taken along line 3—3 of FIGURE 1 and showing the manner in which the wheel weights are carried on the periphery of the adapter plate.
Figure 4:
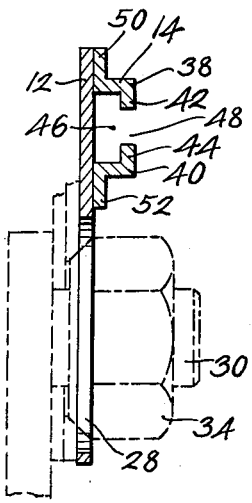
FIGURE 4 is a section similar to FIGURE 3 taken along line 4—4 of FIGURE 1 showing the details of the groove or track on the periphery of the adapter plate.
Figure 5:
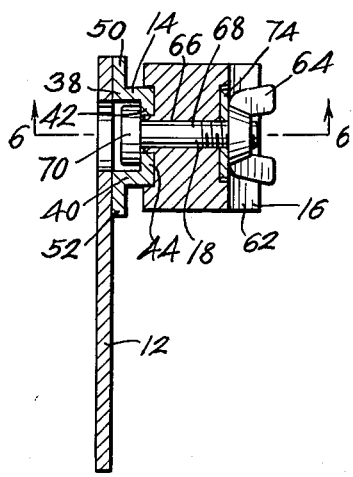
FIGURE 5 is a section similar to FIGURES 3 and 4 but taken along the line 5—5 of FIGURE 1 that shows the fastening means used to adjustably interconnect the wheel weights to the adapter plate.

Referring now to the drawings for a detailed description of the invention, and specifically to FIGURES 1 and 2 thereof, it will be seen that the wheel-balancing assembly of the present invention, which has been indicated in a general way by numeral 10, includes a disk-like adapter plate 12 having a continuous circumferential track 14 formed on its periphery, a pair of wheel weights 16 mounted within the adapter plate track for slidable movement therein, and one or more fasteners 18 operative to interconnect the weights to the plate and maintain the same in fixed adjusted relation. The adapter plate 12 is provided with a central opening 20 sized to receive the hub 22 of a truck wheel or the like 24. The adapter plate also includes a plurality of equi-angularly spaced openings 26 and 28 located to receive the wheel lugs 30 that hold the wheel rim 32 in place upon the wheel disk (FIGURES 3 and 4). Openings 26 and 28 are arranged in alternating relation with openings 26 being smaller and adapted to hold plate 12 in place on the wheel rim when lug nuts 34 are threaded onto the lugs 30. Openings 28, on the other hand, are preferably of a size to pass over the lug nuts 34 so that only alternate nuts must be removed to attach the adapter plate to the rim and the latter is not loosened from the disk 36.

In FIGURES 2, 3, and 4, it can be seen that the track 14 on the outer periphery of the adapter plate is circular and is formed by a pair of radially-spaced parallel ribs 38 and 40 that project forwardly from the front face thereof and have their unattached front edges provided with continuous annular flanges 42 and 44, respectively, that extend inwardly toward one another in radially-spaced opposed relation to define with their respective ribs a partially covered groove or channel 46. The opposed free edges of the flanges are separated from one another to provide a continuous annular slot 48 (FIGURE 4) of a width substantially less than the radial spacing between the ribs and located approximately midway between the latter. In the particular form illustrated herein, the rear attached edges of ribs 38 and 40 are also provided with flanges 50 and 52, respectively, that project in opposite directions from one another and from the front ribs 42 and 44 to provide a wider base for use in attaching the track to the front face of the adapter plate.

Note in this connection that the adapter plate is preferably substantially the same diameter as the wheel rim 32 thus locating the annular track as far as possible from the axis of rotation of the wheel without overlying the tire 54 (FIGURE 1). Thus, the counterbalancing force developed by a wheel weight of a given size is substantially at a maximum. In addition, this construction also places the weights outside the periphery of the brake drum where the most effective counter-balancing effect to accommodate for irregularities therein can be realized. Furthermore, the location of the weights, track and adapter plate is such that they do not interfere in any way with removal of the wheel, servicing of the axle or tire repairs and replacement.

The construction of the wheel weights 16 can best be seen in FIGURES 2, 3, 5, 6 and 8 to which reference will now be made. Each wheel weight is preferably cast from lead or some other heavy metal to conform with the circular arc described by track 14 of the adapter plate. As shown, the weights are each slightly less than 90° in angular extent although this arcuate length cannot be considered especially critical. Obviously, the two weights should be of approximately equal size, length and weight and, therefore, must be less than 180° to provide for adjustment therebetween. The minimum length, of course depends upon the amount of counterbalancing force that may be required to correct for an out-of-balance condition.

The covered or rear face of each weight is provided with a pair of radially-spaced arcuate grooves 56 and 58 adapted to receive the flanges 42 and 44, respectively, of the track 14 for relative slidable movement therein. The rib 60 left between the grooves 56 and 58 then fits into the slot 48 defined by the flanges 42 and 44 of the track. The front or exposed face of the weights, on the other hand, is provided with notches 62 located at one or more points spaced between the ends thereof and which are adapted to receive and countersink the wing-nuts 64 of the fasteners 18. Fastener openings 66 are provided in each weight interconnecting the notches 62 on the exposed front face thereof with the rear face to receive the shanks 68 of the fasteners 18.

FIGURES 1, 5, 6 and 7 show that the fasteners 18 that are used to hold the weights in adjusted position within the track of the adapter plate comprise a bolt having a threaded shank 68, a head 70 at one end of the shank, and a wingnut 64 on the other end. The head 70 of the fastener is sized to slide freely within the groove 46 formed between the ribs of the track, yet be retained therein by the overhanging flanges 42 and 44 while the shank extends forwardly through the slot 48. Also, in the particular form shown, opposite sides of the fastener head have been cut away to form relatively flat surfaces 72 engageable with the opposed faces of the ribs thereby preventing the shank from turning within the slot. In addition, a lock washer 74 has been shown positioned between the wingnut 64 and the base of notch 62 for the purpose of holding the fasteners more securely and also to prevent the wingnut from scoring or otherwise damaging the soft lead of the weights.

Figure 8:
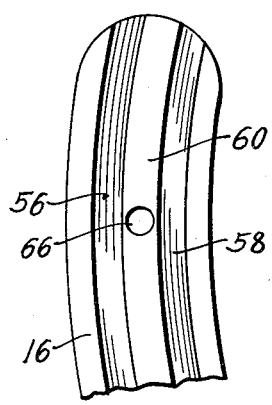
Figures 6, 7:
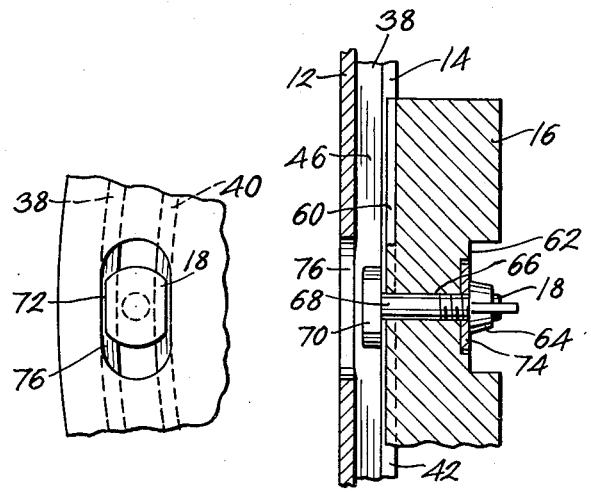
FIGURE 6 is a fragmentary section taken along line 6—6 of FIGURE 5.
FIGURE 7 is a fragmentary rear elevation showing the aperture in the adapter plate used to insert the fastener into the annular track; and, FIGURE 8 is a fragmentary view showing the inside face of the wheel weight.

These same figures of the drawing, except for FIGURE 8, reveal the fact that the adapter plate contains one or more generally elliptically-shaped openings 76 communicating with the track 14 between the annular ribs and adapted to pass the head 70 of the fastener for use in assembling the device.

Finally, the technique used with the wheel-balancing assembly of the present invention to compensate for an out-of-balance condition in a truck wheel or the like will now be described. First of all, the weights 16 are positioned diametrically opposite one another and temporarily fastened in place. Then, while the wheel is still preferably in place on the vehicle, it is jacked free of the ground and turned either by hand or with any one of a number of machines adapted to perform this function. With the wheel running free on the axle, it will come to rest with the heavy section at the lowermost point and will usually rock back and forth a few times with a pendulum-like action before stopping which, of course, clearly indicates an out-of-balance condition. After the wheel has stopped, the lowpoint is marked and the weights are relocated at equal distances on opposite sides thereof with their centers of mass positioned in excess of 90° therefrom. Thus, the two weights acting in combination with one another produce a resultant radial force component opposite to that caused by the eccentric center of mass of the wheel. Of course, at this point the counterbalancing effect of the wheel weights may not be of equal magnitude to that of the eccentric mass of the wheel; therefore, the wheel must again be turned and allowed to come to rest in order to determine which of these two opposed radially-acting force is the greater. If the weights have overbalanced the wheel on the opposite side thereof, they should be moved farther apart with each being shifted an equal distance but on the same half of the wheel. Conversely, should the counterbalancing effect of the weights still be inadequate to compensate for the out-of-balance condition of the wheel, the weights should be moved still closer together by shifting each an equal amount. This process is repeated until the wheel turns without coming to rest at any particular point.

It should also be mentioned that mechanical wheel-balancing machines can also be used which rotate the wheel in the manner aforementioned and also indicate a point on the periphery thereof which lies on the radial line that includes the eccentrically-located center of mass. These machines, of course, are somewhat more accurate for locating the exact position where the counterbalance is required, primarily due to the higher rotational speeds attained thereby. In any event, the counterweights are located and adjusted as before to offset the out-of-balance condition.

Having thus described the several useful and novel features of the wheel-balancing assembly of the present invention, it will be apparent that the many worthwhile objectives for which it was designed have been achieved. While only a single specific embodiment of the invention has been illustrated in the drawings and described in connection therewith, I realize that certain changes and modifications therein may well occur to those skilled in the art within the broad teaching hereof; hence, it is my intention that the scope of protection afforded hereby shall be limited only insofar as said limitations are expressly set forth in the appended claims.

What is claimed is:

1. A wheel-balancing assembly for truck wheels and the like which comprises, a disk-like adapter plate of substantially the same diameter as the wheel rim and which has circumferential circular track on one face thereof that includes a pair of radially-spaced substantially parallel ribs defining a continuous annular groove opening outwardly therefrom, said adapter plate having a plurality of angularly spaced openings therein located an equal radial distance from the center and adapted to receive the wheel lugs for use in fastening the plate to the wheel, a pair of substantially identical unitary wheel weights provided having a rib-like projection on one face thereof and being of a size sufficient and adapted to removably fit into the annular groove in the track of the adapter plate for adjustable slidable movement relative thereto, and at least one fastener adapted to operatively interconnect each wheel weight to the adapter plate and lock same in adjusted position on said one face of the adapter plate, along the track wherein the fasteners include a head on one end thereof, a threaded shank and a nut, the annular groove in the track is sized to receive the head of the fastener for slidable movement therein, and the track includes an annular flange overhanging the groove and adapted to retain the head of the fastener therein.

2. The wheel-balancing assembly as set forth in claim 1 in which the adapter plate track includes a pair of radially-spaced substantially parallel annular ribs cooperating to define the annular groove therebetween, and the annular flange that overhangs the groove depends from the free edge of one of said annular ribs.

3. The wheel-balancing assembly as set forth in claim 1 in which each wheel weight includes an arcuate groove on one side of the rib-like projection positioned and adapted to receive the annular flange of the track.

4. The wheel-balancing assembly as set forth in claim 1 in which the adapter plate includes an opening communicating the groove in the track and adapted to pass the head of the fastener into position therein.

5. The wheel-balancing assembly as set forth in claim 2 in which each of the radially-spaced annular ribs has an annular flange depending from the free edge thereof in overhanging relation to the annular groove, the adjacent edges of said flanges being radially-spaced to define an annular slot therebetween of a width less than the width of the annular groove.

6. The wheel-balancing assembly as set forth in claim 5 in which the adapter plate includes an opening communicating the annular groove in the track and sized to pass the head of the fasteners into position therein.

References Cited in the file of this patent

UNITED STATES PATENTS

| | | |
|---|---|---|
| 79,984 | Jones | July 14, 1868 |
| 1,191,393 | Bergstrom | July 18, 1916 |
| 2,097,894 | Roche | Nov. 2, 1937 |